(12) United States Patent
Martino et al.

(10) Patent No.: US 10,877,984 B1
(45) Date of Patent: Dec. 29, 2020

(54) SYSTEMS AND METHODS FOR FILTERING AND VISUALIZING LARGE SCALE DATASETS

(71) Applicant: Palantir Technologies Inc., Palo Alto, CA (US)

(72) Inventors: Alexander Martino, New York, NY (US); Ashley Einspahr, Palo Alto, CA (US); Alicia Monfre, New York, NY (US); Benjamin Mittelberger, New York, NY (US); Erik Jarleberg, Stockholm (SE); Justin Streufert, Frederick, MD (US); Martin Manville, Washington, DC (US); Pearson Henri, New York, NY (US); Robert Giardina, Falls Church, VA (US); Shelby Pefley, Los Altos Hills, CA (US); Savino Sguera, London (GB); Wenshuai Hou, Washington, DC (US)

(73) Assignee: Palantir Technologies Inc., Palo Alto, CA (US)

( * ) Notice: Subject to any disclaimer, the term of this patent is extended or adjusted under 35 U.S.C. 154(b) by 136 days.

(21) Appl. No.: 15/913,788

(22) Filed: Mar. 6, 2018

Related U.S. Application Data

(60) Provisional application No. 62/595,882, filed on Dec. 7, 2017.

(51) Int. Cl.
  *G06F 17/00* (2019.01)
  *G06F 16/248* (2019.01)
  (Continued)

(52) U.S. Cl.
  CPC .......... *G06F 16/248* (2019.01); *G06F 16/244* (2019.01); *G06F 16/26* (2019.01); *G06F 16/335* (2019.01)

(58) Field of Classification Search
  CPC ............ G06F 16/248; G06F 16/24578; G06F 3/0482; G06F 3/04842; G06F 16/26; G06F 16/29
  See application file for complete search history.

(56) References Cited

U.S. PATENT DOCUMENTS

| 5,515,488 A | 5/1996 | Hoppe et al. |
| 6,430,305 B1 | 8/2002 | Decker |

(Continued)

FOREIGN PATENT DOCUMENTS

| CN | 102546446 | 7/2012 |
| CN | 103167093 | 6/2013 |

(Continued)

OTHER PUBLICATIONS

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

(Continued)

*Primary Examiner* — Truong V Vo
(74) *Attorney, Agent, or Firm* — Sheppard Mullin Richter & Hampton LLP

(57) ABSTRACT

Systems and methods are provided for analyzing data in one or more datasets. One or more data objects can be searched for within the one or more datasets. One or more visualizations can be generated based on the results of the search for the one or more data objects in the one or more datasets. When a user interacts with a visualization, e.g., by applying a filter, removing a filter, focusing on a particular subset of the one or more data object, etc., the visualization is updated automatically. Moreover, other visualizations generated based on the same search results may be simultaneously and automatically updated and presented to the user. Rather than a user having to analyze and consume data in a tabular (Continued)

format, the user can interact with representative visualizations to more readily discover and/or reveal aspects of the one or more data objects that would normally be hidden in the tabular format.

20 Claims, 10 Drawing Sheets

(51) Int. Cl.
*G06F 16/26* (2019.01)
*G06F 16/242* (2019.01)
*G06F 16/335* (2019.01)

(56) References Cited

U.S. PATENT DOCUMENTS

| | | |
|---|---|---|
| 6,820,135 B1 | 11/2004 | Dingman |
| 6,978,419 B1 | 12/2005 | Kantrowitz |
| 6,980,984 B1 | 12/2005 | Huffman et al. |
| 7,168,039 B2 | 1/2007 | Bertram |
| 7,461,077 B1 | 12/2008 | Greenwood |
| 7,617,232 B2 | 11/2009 | Gabbert et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,037,046 B2 | 10/2011 | Udezue et al. |
| 8,046,283 B2 | 10/2011 | Burns |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,566,334 B2 * | 10/2013 | Lehtipalo ............... G06F 16/26 707/758 |
| 8,577,911 B1 | 11/2013 | Stepinski et al. |
| 8,589,273 B2 | 11/2013 | Creeden et al. |
| 8,688,573 B1 | 4/2014 | Ruknoic et al. |
| 8,744,890 B1 | 6/2014 | Bernier |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,335,911 B1 | 5/2016 | Elliot et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2003/0126102 A1 | 7/2003 | Borthwick |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0026170 A1 | 2/2006 | Kreitler et al. |
| 2006/0080283 A1 | 4/2006 | Shipman |
| 2006/0143034 A1 | 6/2006 | Rothermel |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0185867 A1 | 8/2007 | Maga |
| 2007/0192122 A1 | 8/2007 | Routson et al. |
| 2007/0284433 A1 | 12/2007 | Domenica et al. |
| 2008/0065655 A1 | 3/2008 | Chakravarthy et al. |
| 2008/0069081 A1 | 3/2008 | Chand et al. |
| 2008/0077642 A1 | 3/2008 | Carbone et al. |
| 2008/0103996 A1 | 5/2008 | Forman et al. |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0132953 A1 | 5/2009 | Reed et al. |
| 2009/0157732 A1 | 6/2009 | Hao et al. |
| 2009/0187546 A1 | 7/2009 | Whyte et al. |
| 2009/0187548 A1 | 7/2009 | Ji et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0098318 A1 | 4/2010 | Anderson |
| 2010/0106752 A1 | 4/2010 | Eckardt et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett et al. |
| 2010/0312837 A1 | 12/2010 | Bodapati et al. |
| 2011/0040776 A1 | 2/2011 | Najm et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218955 A1 | 9/2011 | Tang |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1 | 12/2011 | Chang et al. |
| 2012/0004904 A1 | 1/2012 | Shin et al. |

(56) References Cited

U.S. PATENT DOCUMENTS

| | | |
|---|---|---|
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0179699 A1* | 7/2012 | Ward ............... G06F 16/2246 707/754 |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | Ei-Yaniv et al. |
| 2013/0218879 A1 | 8/2013 | Park et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0180557 A1 | 6/2016 | Yousaf et al. |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| WO | WO 2005/116851 | 12/2005 |
| WO | WO 2012/061162 | 5/2012 |

OTHER PUBLICATIONS

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"SAP BusinessObjects Explorer Online Help," Mar. 19, 2012, retrieved on Apr. 21, 2016 http://help.sap.com/businessobject/product_guides/boexir4/en/xi4_exp_user_en.pdf.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

Distimo—App Analytics, <http://www.distimo.com/app-analytics> Printed Jul. 18, 2013 in 5 pages.

Flurry Analytics, <http://www.flurry.com/> Printed Jul. 18, 2013 in 14 pages.

Gill et al., "Computerised Linking of Medical Records: Methodological Guidelines,".

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Gu et al., "Record Linkage: Current Practice and Future Directions," Jan. 15, 2004, pp. 32.

(56) References Cited

OTHER PUBLICATIONS

Hansen et al., "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services", HiPC 2006, LNCS 4297, pp. 277-288, 2006.
Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@ct.11.03.086-088.pdf.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
Psaltis, Andrew G., "Streaming Data—Designing the Real-Time Pipeline," Jan. 16, 2015, vol. MEAP VO3, pp. 0-12.
Sigrist, et al., "PROSITE, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing On The Fly, <http://testflightapp.com/> Printed Jul. 18, 2013 in 3 pages.
trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

\* cited by examiner

DataSet 1: Phone Records (228 records) ~402

Callee Phone#: 858-555-5555 ~404

406

| Date | Duration | Caller# | Type |
|---|---|---|---|
| 1-22-2017 | 1 min | 858-222-2222 | Wireless |
| 2-24-2017 | 15 min | 619-000-0000 | Landline |
| 2-24-2017 | 22 min | 619-444-4444 | Landline |
| 1-13-2017 | 25 min | 858-222-2222 | Wireless |
| ... | ... | ... | ... |

SYSTEMS AND METHODS FOR FILTERING AND VISUALIZING LARGE SCALE DATASETS

CROSS REFERENCE TO RELATED APPLICATIONS

This application claims the benefit under 35 U.S.C. § 119(e) of U.S. Provisional Application Ser. No. 62/595,882, filed Dec. 7, 2017, the content of which is incorporated by reference in its entirety into the present disclosure.

TECHNICAL FIELD

This disclosure relates to approaches for analyzing data and generating visualizations of the analyzed data.

BACKGROUND

Data processing applications are increasingly being used to analyze large and oftentimes complex datasets, commonly referred to as "big data," e.g., large volumes of financial transactions, large sets of call records, health records, prescription data, genomics data, and the like. The analysis of these large and complex datasets can involve identifying trends, and/or discovering relationships between data objects in those datasets. However, conventional data processing applications are geared more towards experienced users, such as data analysts, that already have an analytical mindset. Accordingly, conventional data processing applications are not designed to provide less experienced users with an intuitive way to analyze data and present the resulting analysis in a visual, easy-to-understand manner.

SUMMARY

A claimed solution rooted in computer technology overcomes problems specifically arising in the realm of computer technology. In various implementations, a data processing application is used to search for a certain data object(s) in a dataset(s). Intuitive visualizations may be generated based on the results of the search. Operations may be performed within those visualizations to allow a user to further analyze the dataset(s). For example, filters may be applied to and/or removed from the visualizations to allow a user to further drill down into a dataset(s), data in the dataset(s) may be sorted, data in the dataset(s) may be aggregated or grouped according to various factors/parameters, etc. In this way, a user may more easily consume/understand data in the dataset(s).

Various embodiments of the present disclosure include systems, methods, and non-transitory computer readable media configured to perform a search for one or more data objects in one or more data sets. A plurality of visualizations is automatically generated based on results of the search, each of the plurality of visualizations representing a different graphical representation of the results of the search. An impact of a user interaction on a first visualization of the plurality of visualizations is reflected simultaneously with a corresponding impact of the user interaction on each remaining visualization of the plurality of visualizations.

In some embodiments, the plurality of visualizations comprise a histogram, an event line, a line chart, a link map, a heat map, a timeline, a table, and an event block representation.

In some embodiments, the user interaction comprises one of a filtering operation, a de-filtering operation, a data object selection operation, an aggregation operation of two or more of the data objects, and a sorting operation regarding the one or more data objects. In some embodiments, each of the plurality of visualizations is generated based upon a JavaScript Object Notation configuration.

In some embodiments, the systems, methods, and non-transitory computer readable media are configured to at least one of present and publish the JavaScript Object Notation configuration. In some embodiments, the filtering operation comprises refining the results of the search based upon a subset of the one or more data objects. In some embodiments, the de-filtering operation comprises refocusing the results of the search on a subset of the one or more data objects. In some embodiments, the data object selection operation comprises highlighting a subset of the one or more data objects.

These and other objects, features, and characteristics of the systems and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

FIG. 4A illustrates an example data analysis interface in accordance with one embodiment of the present disclosure.

DETAILED DESCRIPTION

A claimed solution rooted in computer technology overcomes problems specifically arising in the realm of computer technology. In various implementations, a data processing application is used to search for a certain data object(s) in a dataset(s). Intuitive visualizations may be generated based on the results of the search. Operations may be performed within those visualizations to allow a user to further analyze the dataset(s). For example, filters may be applied to and/or removed from the visualizations to allow a user to further drill down into a dataset(s), data in the dataset(s) may be sorted, data in the dataset(s) may be aggregated or grouped according to various factors/parameters, etc. In this way, a user may more easily consume/understand data in the dataset(s).

The visualizations can be interactive, and individual visualizations can be combined to create a report. When a user interacts (e.g., applies a filter or focuses on a certain data object(s)) with one of the individual visualizations, the other visualizations making up the board or report can simultaneously react to the user interaction. That is, the individual visualizations can interact with each other creating myriad permutations that result in different ways of consuming or analyzing the data in the dataset(s). At the same time, experienced users are provided with more flexibility in creating custom visualizations.

Visualizations can be generated using modular base widgets that analyze the data of interest. A visualization in the data analysis application may be based on some corpus of JavaScript Object Notation (JSON) configurations. An option can be provided to authorized users allowing them to see a corresponding JSON configuration (code-like) specification that can be copied, shared, published, etc. for use by another user and/or in another instance of the data processing application.

In operation, a user may perform an initial search for some data of interest. For example, a search may be performed for a known phone number of a person of interest in an investigation. The search can be run against some document collection(s), such as a collection of call records. The user may then be presented with visualization options including pre-configured reports made up of multiple visualizations, as well as individual visualizations, e.g., heatmaps, network graphs, line charts, histograms, timelines, etc. that provide a visual representation of the search results. Upon selection of a pre-configured report or individual visualization, the visualization(s) can be rendered. The user may then interact with the visualization(s), e.g., applying/removing filters, focusing on certain data presented with the visualization(s), etc.

Example Data Analysis System and Data Architecture

Figure 1:
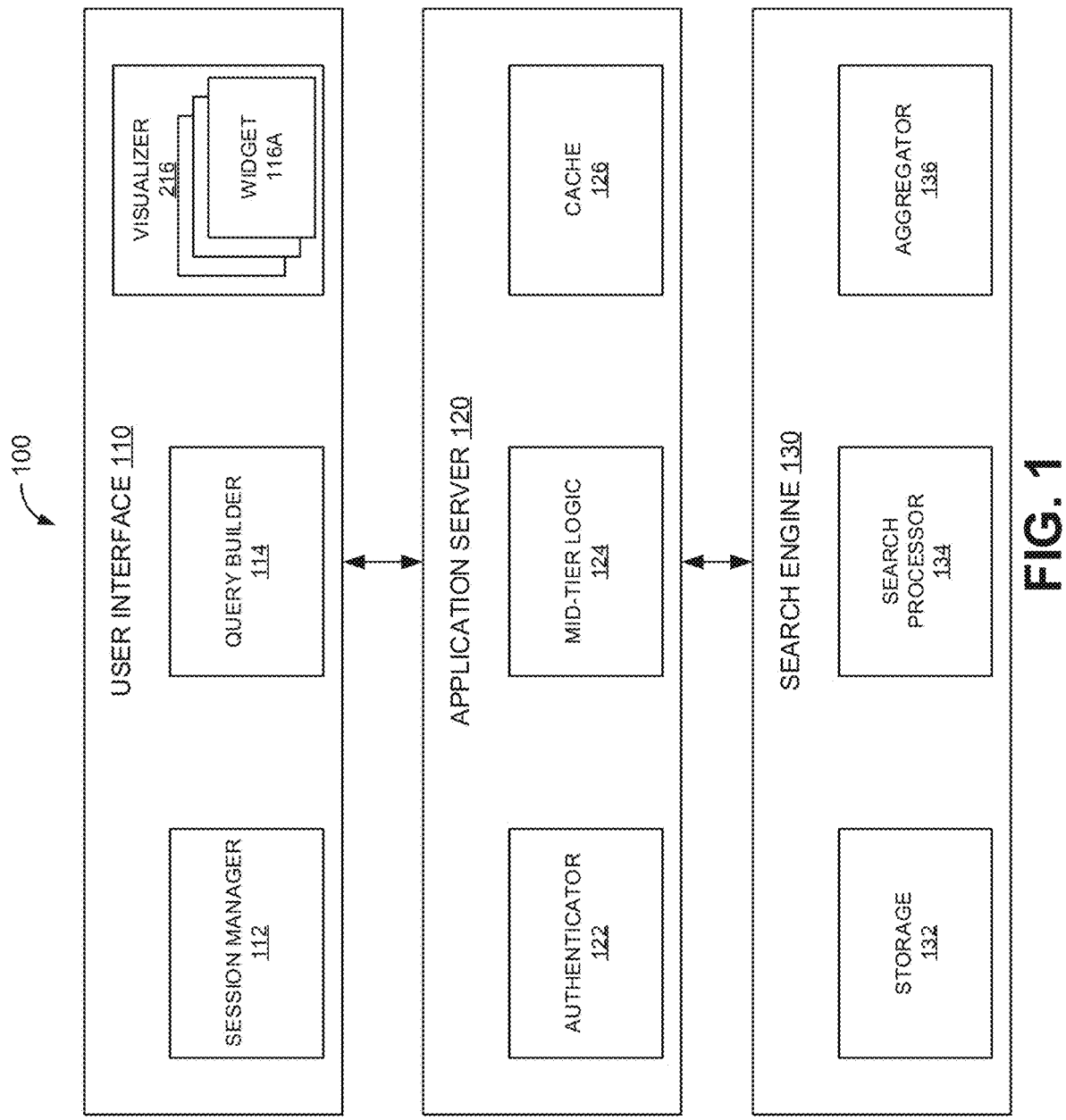
FIG. 1 illustrates an example data analysis system in accordance with one embodiment of the present disclosure.

FIG. 1 is a block diagram depicting an exemplary data analysis system 100, consistent with embodiments of the present disclosure. Among other things, data analysis system 100 facilitates user querying of one or more data sources and presenting or displaying the query results. System 100 is shown as an arrangement of functional blocks. These functional blocks may be implemented in hardware, software, or a combination of the two. For example, the functional blocks of system 100 may be implemented as special purpose computing devices, such as application specific integrated circuits. In other examples, the functional blocks of system 100 may be implemented as software on specialized hardware.

System 100 may include user interface 110 to receive user input and generate output. User interface 110 may facilitate user interaction with system 100. User interface 110 may receive and process user text entries and graphical selections. For example, user interface 110 may receive signals from input devices, process the signals, and initiate appropriate action based on the input, such as initiating a search, rendering a graphic, or archiving results. Receiving a user-initiated mouse click, for example, may cause user interface 110 to initiate a search query. User interface 110 may also provide output for a user to view. For example, user interface 110 may display graphics, such as search results, on a display device (e.g., a monitor) for the user to view.

In some embodiments, user interface 110 may be a web application, which may run in a generic web browser. For example, user interface 110 may be a CoffeeScript application running on a web browser. In other embodiments, an independently executable program may provide user interface 110.

User interface 110 may include session manager 112 to provide administration during user interactions with system 100. For example, a user may initiate a session on system 100. Based on the session initiation, session manager 112 may set up and maintain a connection between user interface 110 and application server 120, verifying that a search engine 130 is ready to receive queries. To set up the session for a particular user, session manager 112 may load user preferences, retrieve stored results, and tie new session actions to the users account.

In some embodiments, session manager 112 may monitor user interactions with user interface 110. Based on the user action history, session manager 112 may maintain a current state of system 100. Session manager 112 may be able to recall the state of system 100 should the user need to continue working after a break, or should an error cause the session to abruptly crash. For example, session manager 112 may maintain a record of user search queries, flagged documents, and connected databases. Session manager 112 may recall the records after interruptions in the session to recreate the state of system 100 when the user last provided input. For example, a user may enter a series of interrelated queries using user interface 110. A user may provide input to format the results using a particular format, such as forming a bar graph. Due to a malfunction of system 100, user interface 110 may stop running unexpectedly. In this example situation, session manager 112 may recall the prior searches and result formats received from input. Session manager 112 may recreate the state of system 100 prior to the malfunction, which may, for example, advantageously prevent work from being lost.

In some embodiments, queries, the results of queries, as well as specific visualizations that are rendered for a first user may be shared with another user (provided the other use has the requisite authority to view the data that is the subject or such queries/visualizations. Accordingly, session manager 112 may monitor and keep track of current states of the data, visualizations, etc. In this way, shared visualizations or queries can be synchronized instances of user interface 110. For example, a first user may share a visualization with a second user. The visualization created by the first user may have specific characteristics that are captured or set forth in a "widget" and reflected in a code-like configuration specification. The widget and/or configuration specification may be shared with the second user. The second user may run the widget/execute the configuration specification on his/her own instance of user interface 110. Prior to rendering the visualization for the second user, session manager 112 may be accessed to determine the proper state of the data.

User interface 110 may include query builder 114 to manage user search queries. Query builder 114 may receive user input and identify it as search query input. In some embodiments, a user may type text into a field of user interface 110. Query builder 114 may identify the text entry of a user as a query command. In some embodiments, user interface 110 may display a visual representation of results. Responsive to a user selection of a region of the visual display, query builder 114 may create a new search query to return a subset of results corresponding to the selection region. For example, user interface 110 may display a histogram based on the creation date of documents resulting from the query "Douglas Hartford." User interface 110 may receive a user selection corresponding to the histogram bar for the year 2009. Responsive to the user selection, query builder 114 may create a new query to retrieve all documents having a creation date in the year 2009 that contain "Douglas Hartford." User selections of other graphics, such as diagrams, trees, tables, and charts may be used by query builder 114 to create similar queries.

Query builder 114 may allow a user to combine queries to filter results. Rather than storing a set of results and filtering the results into a subset, query builder 114 may combine the necessary criteria to obtain the subset into a single search. For example, a user may initially request all documents containing a reference to the entity "Bonny Smith." After viewing the results from the name query, a user may determine that they would further like to refine the results to only show "Bonny Smith" documents from the years 2012 to 2014. To obtain the refined query containing the subset, query builder 114 may combine, based on user input, the query for "Bonny Smith" and the years 2012 to 2014 into a single query, instead of applying the time range query to the actual name query results set.

In another example, a user may want to know if any documents containing "Bonny Smith" from 2012 to 2014 overlap with a set of documents related to transactions by "Clyde Jones" exceeding $10,000. In this example, query builder 114 may generate a new query based on the two queries corresponding to the results sets, rather than aggregating the results entries for each set, comparing them, and generating any overlapping documents. Using a query-based approach may advantageously provide more efficient results because, for example, the query results set from the base searches may not need to be stored or indexed. Instead, a new query may be submitted to readily search the entire collection of indexed documents.

Query builder 114 may generate queries using a standardized format. In some embodiments, a query datatype (e.g., "AbstractQuery") may define the structure used by query builder 114. For example, query builder 114 may initialize an AbstractQuery object that corresponds to given search criteria. Because AbstractQuery may be used to identify a particular set of data, a particular instance of AbstractQuery may represent a specific set of documents. For example, an instance of AbstractQuery may be used as a universal token which is passed between different processes of system 100. Thus, rather than exchanging a list of document numbers or the documents themselves, system 100 may transfer an AbstractQuery instance referencing a collection identifier to identify a particular set of documents.

The AbstractQuery class may define the format for querying various field types (e.g., text, numbers, dates). For example, an AbstractQuery instance may include a tree of Boolean filters to apply, fields to return, set orders, and limits. The class may be extensible to accommodate search field variations of unique data sets. To query documents having unusual data fields (e.g., fields containing Unicode symbols or emoji), query builder 114 may receive and initialize queries using an addendum that extends the AbstractQuery class.

When user interface 110 receives results from queries, user interface 110 may include visualizer 116 to produce graphics or other visual representation(s) illustrating the results. Visualizer 116 may receive query results from application server 120. In some embodiments, visualizer 116 may receive a list of document identifiers, such as unique document index values. The document identifiers may be accompanied by document field values. For example, a document identifier may be sent with entities associated with the document, a location, a timestamp, and a narrative. Other field values may exist to accommodate any data from any document format. The individual fields may be individually indexed.

In some embodiments, visualizer 116 may produce a table of query results for display. Visualizer 116 may organize the results in rows with each column corresponding to a particular field type. For example, a table may include columns for first name, last name, account number, institution, and date for a document. Visualizer 116 may rearrange, organize, and sort the table based on user input. For example, a user may list documents by ascending date of generation.

In some embodiments, visualizer 116 may produce a graph for display. Based on the query results, visualizer 116 may automatically compute values for a chart. Predefined graph formats, such as pie charts, bar charts, histograms, and link diagrams, may allow visualizer 116 to autonomously display relevant graphs.

Visualizer 116 may allow a user to select a column of a table of results. Based on the format of the field of the selected column, visualizer 116 may determine which type of graph to display. For example, for a column that corresponds to a date field, visualizer 116 may generate a histogram illustrating the distribution of the query results over time. The size of the divisions of the histogram may be adjustable and/or predefined by settings. For example, settings may define that the histogram should include only twelve time sections, regardless of the length of the time period of results. User interface 110 may receive input from users to change the formatting of the histogram to meet their needs. In another example, a user may select a column related to a field that is text-based categories, such as institution names. By tallying the number of results for each institution name appearing in the query results, visualizer 116 may automatically generate a pie chart or bar graph of the tallies.

In an embodiment, visualizer 116 may generate a link diagram. The link diagram may include icons for entities (e.g., institutions from which documents originated and persons mentioned in the documents) and documents. Responsive to a user selection of a particular entity, visualizer 116 may display lines corresponding to the documents related to that entity; the documents may, in turn, link to other entities. Thus, visualizer 116 may present a straight forward graphic for determining the path of documents and related parties.

In some embodiments, visualizer 116 may produce a document for display. Responsive to a user selection of a particular field, visualizer 116 may generate a reader view of the document itself. To easily identify the field in the document, visualizer 116 may highlight the selected field. Visualizer 116 may determine the location of the fields in the entire text based on the index values of the fields.

In some embodiments, visualizer 116 may render a map for display. Responsive to a user selection of a particular entity, action, or other subject of interest or aspect of a subject of interest, a map may be generated reflecting where the particular entity is, has been, etc. For example, a user may wish to view where a particular entity has been spotted. In some embodiments, the map may be generated relative to a desired geographical region and/or level of granularity, e.g., at a city-level, state-level, country-level, etc. In some embodiments, the map may be a heat map, color shading, or other visual augmentation(s) applied to the map reflecting a level of interaction, e.g., how long the entity spent at a particular location, the frequency with which the particular entity visited a particular location, etc.

It should be noted that visualizer 116 is contemplated as being configured to display, present, or otherwise render other types of graphical representations of data or related to data, not only the types described hereinabove. Moreover, in some embodiments, a user may wish to combine aspects of individual visualizations, in which case, visualizer 116 may control the merging of data and visual aspects to accommodate the desired combination-visualization. For example, above and beyond presenting multiple individual visualizations in a particular report, actual elements of individual visualizations may be combined, such as overlaying a link map on a geographical heat map.

Individual visualizations may be implemented by way of "widgets" 116A, e.g., small software applications or graphical UI (GUI) control elements configured to render a visualization. In some embodiments, a report may be a collection of widgets. Widgets may be invoked by a plugin at the report/UI level. In some embodiments, the rendered visualizations may be dynamic and/or interactive. Accordingly, visualizations, such as a histogram, bar graph, map, etc. can be updated in real time as various filtering parameters are each selected, or other actions/interactions are undertaken by the user. In some embodiments, the subject(s) or element(s) of interest in a dataset can change or be updated. Accordingly, a visualization representing the subject(s) or element(s) of interest also changes or is updated commensurate with the subject(s) or element(s) change. Widgets may be stored locally, e.g., on a computer system hosting or executing the application/user interface 110, such as computer system 600 (FIG. 6), or remotely, e.g., in cache 126 other storage/memory of application server 120.

As one example of the dynamic nature of rendered visualizations, a link map representative of all calls made to a particular callee phone number may be rendered by a widget 116A. The particular callee phone number may be the subject of interest from a phone records dataset that, along with caller phone numbers that are known to have placed calls to the callee phone number, are part of or derived from the phone records dataset. A user may wish to apply a filter to the link map in order to focus in on those caller phone numbers that have made the most number of calls to the callee phone number. Upon the user focusing or specifying the selection of these caller phone numbers, widget 116A may update the link map to show only those caller phone numbers that are the focus of the user vis-à-vis the applied filter or user selection.

As alluded to above, reports may comprise a plurality of individual visualizations. If a first visualization of a report, e.g., the aforementioned link map, changes, any other visualizations of the report should also change/update in order to present a data-synchronous report to the user. Accordingly, a bar graph visualization presented in a report along with the link map that originally reflected the total number of calls made to the callee phone number may be adjusted to reflect the change in focus. That is, the bar graph visualization may be re-rendered to only show the caller phone number of interest, or the bar graph visualization may be re-rendered to represent additional graphics highlighting the caller phone numbers of interest.

In some embodiments, a particular time period or instance at which a dataset is analyzed, filtered, rendered, etc., can be "pinned" so that the dataset in that particular time period or instance may be captured if desired. As previously noted, the session manager 112 can monitor the state of a dataset and/or the queries made against the dataset. In the case of pinning a dataset, the session manager 112 can, in some embodiments, take a snapshot of the dataset at a desired time or instance so the state of data in that dataset at the desired time or instance can be captured, stored, etc. This can be especially useful in the event visualizations and/or reports are being shared between multiple users.

System 100 may include application server 120 to provide network processing resources. Application server 120 may host a variety of support services and act as an interface between user interface 110 and search engine 130.

Application server 120 may include authenticator 122 to manage user identification. To determine the user to which the session belongs, authenticator 122 may receive user identifying information, such as log in credentials (e.g., username and password). Although, more robust security schemes may be used, such as biometric authentication. User authentication may enable application server 120 to retrieve prior session data and restore user workspaces.

Authenticator 122 may facilitate linking with search engine 130. In some embodiments, search engine 130 may require login credentials in order to service queries. Authenticator 122 may provide search engine 130 with the necessary user credentials, such as a user name and password. Authenticating a user at search engine 130 may allow system 100 to track individual user usage of processing resources. Based on a user's usage of search engine 130, system 100 may provide feedback to user to better optimize search strategy. Errant queries, for example, may waste processing resources of search engine 130. By tracking queries per user, system 100 may allow work to be billed on a per query basis.

It should be noted that in some embodiments, visualizations and/or reports may be shared between users. A user sharing one or more visualizations or reports to another user may not wish for the other user to change, manipulate, or otherwise interact with the shared visualizations and/or reports except to view the visualizations and/or reports. In such a scenario, user interface 110 and/or another instance of user interface 110 being used by the other user may be put into a "static" mode. In some embodiments, the widget used to generate a visualization can be protected so that execution of the widget to generate a visualization for another user is limited to displaying the visualization unless the other user can authenticate him/herself. In this static or protected mode, visualizations may only be viewed, moved (within a report, for example, and/or resized).

Visualizations may be based on some corpus of JSON configurations. When a visualization/widget is created, some level of user-specific caching is performed. Accordingly, in order to share a visualization or a report comprising a plurality of visualizations, the configuration specification can be published back to the main JSON configuration of a view. In some embodiments, a visualization/widget may be saved as an artifact and associated with a particular filter(s) that can be shared with another user. That is, a JSON defining the filter(s) used and a JSON specification defining the view of the visualization are shared. The system/user interface receiving the shared visualization/widget can interpret both JSONs defining the filter(s) and view(s) and apply the filter(s) to the view(s).

Application server 120 may include mid-tier logic 124 to translate search queries. Mid-tier logic 124 may receive search queries from user interface 110 and format the queries to send to search engine 130. In some embodiments, mid-tier logic 124 may reformat a query from the search object initialized by query builder 114 and create a new search instruction that may be compatible with search engine 130. For example, query builder 114 may initialize AbstractQuery objects, which are a particular search query variables indicating the search terms. However, in some embodiments, search engine 130 may utilize a search backend, such as an Elasticsearch engine, that may not be able to process AbstractQuery objects. Therefore, Mid-tier logic 124 may process the AbstractQuery object and transform the object into a search request format compatible with the particular search backend. Similarly, in some embodiments, mid-tier logic 124 may translate search results from search engine 130 to send to user interface 110. Mid-tier logic 124 may receive query results in a format native to the particular search backend employed by search engine 130. By reformatting the search results into a format compatible with user interface 110, mid-tier logic 124 may facilitate the efficient production of visuals based on the search results.

In some embodiments, mid-tier logic 124 may support querying multiple collections at once. Mid-tier logic 124 may submit multiple queries to search engine 130 at once and receive multiple results. For example, multiple instances of AbstractQuery may be aggregated and applied to multiple collections of documents having different formats. Mid-tier logic 124 may reformat the multiple queries for various collections into a single query to submit to search engine 130. To support processing of multiple results received from search engine 130 in response to a combined query, mid-tier logic 124 may include processes to compare and separate the search results for the combined query. For example, mid-tier logic 124 may include post-processing functions such as selecting results, joining results, sorting results, and projecting results. Additional functions may be provided to address unique needs of a particular combination of collection formats.

Application server 120 may include cache 126 to store a local copy of search request data. Cache 126 may locally store translated searches and reformatted search results. By maintaining translated versions of frequent or resource intensive searches and results, cache 126 may serve results much more quickly and reduce and reduce the burden on processing resources, such as mid-tier logic 124 and search processor 134.

In some embodiments, cache 126 may include configurable policies. A configuration file may define the amount of data stored by cache 126 and the caching trigger conditions. System 100 may alter the configuration parameters of cache 126 to match the needs of a given collection or search, based on the available resources of application server 120 and search engine 130. For example, when application server 120 processes large results sets, less memory may be free to devote to caching.

System 100 may include search engine 130 to perform searches. Search engine 130 may receive search requests from, and provide results to, application server 120. In some embodiments, search engine 130 may be a server-based enterprise search engine. For example, search engine 130 may be an Elasticsearch search server. However, because mid-tier logic 124 provide translation processes, search engine 130 may utilize different formats without affecting the user experience.

Search engine 130 may include one or more server hardware units. For example, search engine 130 may include one or more hardware processors (e.g., processor 604 of FIG. 6) connected to memory hardware (e.g., main memory 606, storage device 610 of FIG. 6). Search engine 130 may include a wired or wireless network interface (e.g., communication interface 618 of FIG. 6) that connects the hardware processors to a network (e.g., local network 622, Internet 628 of FIG. 6). Disclosed hardware may be programmed to perform disclosed functions. For example, memory may include instructions for a processor to perform Elasticsearch functions.

Search engine 130 may include storage 132 to maintain data that is subject to searching. Search engine 130 may use separate collections for each document format type. Storage 132 may include a particular data architecture to facilitate searching.

It should be noted that datasets upon which data analysis and visualizations are based can be specified via URL. That is, one or more components of user interface 110, application server 120, and/or search engine 130 can be provided with a URL at which one or more datasets are maintained. The data analysis and/or rendering of visualizations can access such a URL and the respective actions can be taken with respect to the datasets to which the URL points.

Figure 2:
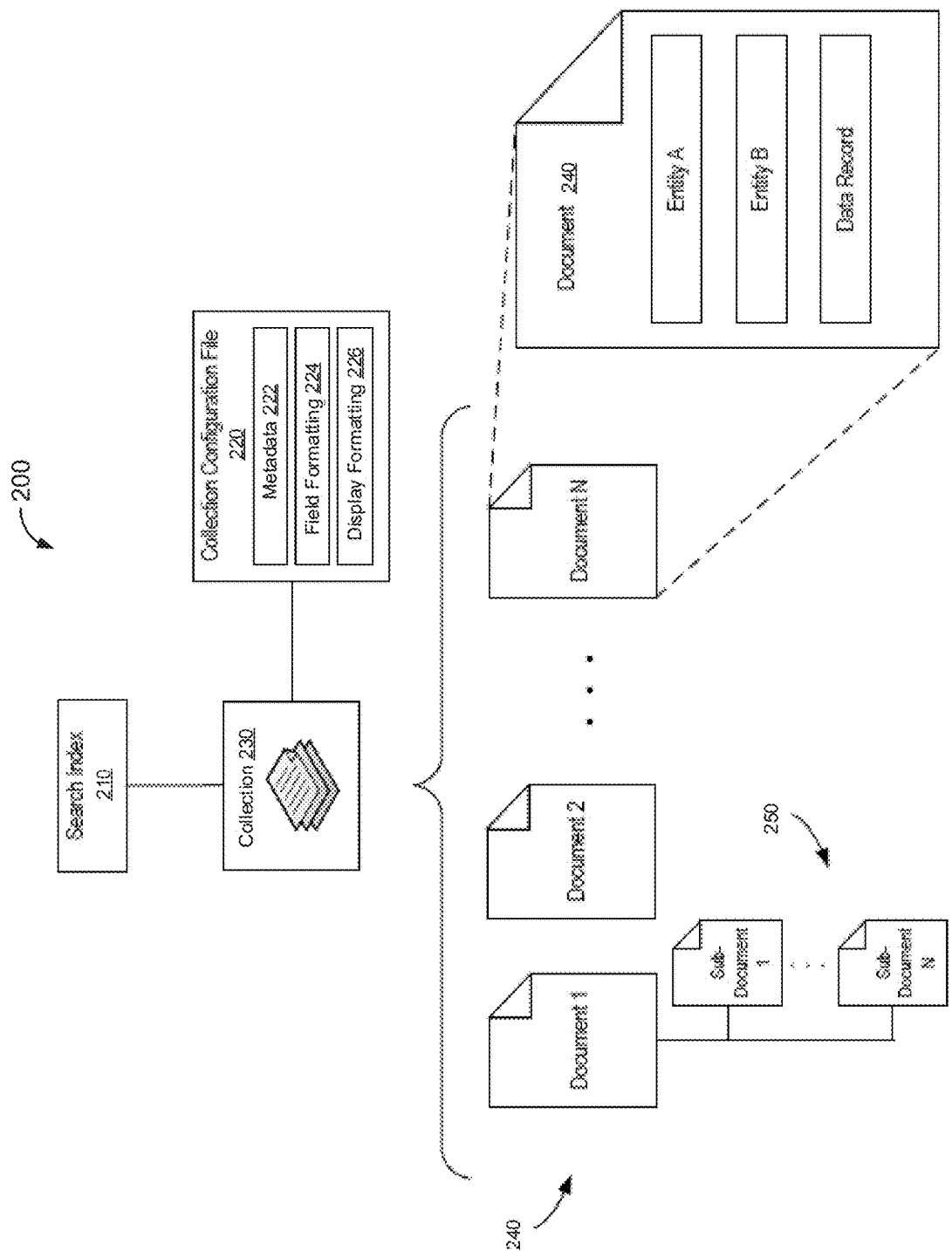
FIG. 2 illustrates an example data architecture in accordance with one embodiment of the present disclosure.

FIG. 2 illustrates an example data architecture 200, consistent with embodiments of the present disclosure. Data architecture 200 provides a way to organize large volumes of documents into usable records.

Collection 230 may include a large number of documents 240. In some embodiments a collection may include millions of documents 240. Documents 240 of a given collection 230 may all have the same format. For example, documents 240 may have the same fields. As shown, documents 240 may include two entities (e.g., "Entity A" and "Entity B") and a data record. For example, documents 240 could be financial transaction receipts between two parties, where the data record may indicate the details of the transaction (e.g., currency exchanged, date, time, location). Other document collections may include additional fields (not depicted). Example documents may include SARs, tax returns, bank transaction records, etc.

In some embodiments, documents 240 may each include one or more sub-documents 250. Documents 240 may be general records, while sub-documents 250 may be individual reports. For example, documents 340 may be shipping orders, while sub-documents 250 may be individual shipping container logs for the corresponding shipping order. In another example, documents 240 may be monthly user stock transaction account reports with the individual stock trade records for the transactions in the account report may act as sub-documents 250. Additional document and sub-document formats may be used. However, some embodiments may not include sub-documents 250.

Collection 230 may include search index 210 to facilitate information retrieval from collection 230. Search index 210 for every one of documents 240 in collection 230, search index 210 may index each field. For example, search index 210 may index Entity A and Entity B separately. In an embodiment, search index 210 may include a corresponding location of the indexed field within a document. Search index 210 may indicate the line or character range for a particular indexed field. For example, search index 210 may indicate that Entity A (e.g., "John Huckleberry") is displayed on the fifth line of the document. Based on the particular search backend, search index 210 may follow different formats. For example, when search engine 130 is an Elasticsearch search engine, search index 210 may follow a format for use in an Elasticsearch server.

Collection 230 may include collection configuration file 220 to define the type of documents stored in collection 230. Collection 230 may include a plethora of documents that follow the same format. Collection configuration file 220 identifies the common format of the documents in collection 230. For example, when documents 240 correspond to currency transactions, collection configuration file 220 may indicate which fields corresponds to the entities involved in the transaction, the currencies used, and the time toe exchange occurred.

Collection configuration file 220 may include metadata 222 to generally describe collection 230. Metadata 222 may indicate how collection 230 is implemented. For example, metadata 222 may include a version number and a title for collection 230. Metadata 222 may include other information such as a last revision date or the number of documents in the collection.

Collection configuration file 220 may include field formatting 224 to define the field types of formats for the type of documents stored in collection 230. As shown, field formatting 224 may indicate that documents 240 contain three text fields: Entity A, Entity B, and Data Record. For example, field formatting may indicate that Entity A and Entity B are text strings that represent entities, while data record may be a longer text narrative describing the transaction.

Collection configuration file 220 may include display formatting 226 to describe how various fields of documents should be displayed in user interface 210. Display formatting 220 may indicate the style, format, and layout for fields of documents 240. For example, display formatting 226 may indicate that Entity A and Entity B should be displayed in all capital letters. In another example, display formatting 226 may indicate that when an entity corresponds to a person's name, the name should be display as "LAST NAME, FIRST NAME." For dates and times, display formatting 226 may indicate which time zone and notation to use (e.g., Month-Date-Year or Date-Month-Year). Other fields may have additional configuration display format options.

In some embodiments, collection configuration file 220 may include access control data. Collection configuration file 220 may identify parties that are allowed to access the corresponding collection 230. For example, when a collection includes classified documents, collection configuration file 220 may identify the security clearance needed to search and/or view the collection. Search engine 130 may receive user authentication credentials from authenticator 122 to permit searching and viewing of restricted documents.

It should be understood that collection 230 is not limited to documents per se, but can include data maintained in a data store or data repository. Data can be stored in various formats, other than merely documentary-type formats, e.g., electronic tables, matrices, lists, etc.

Returning to FIG. 1, storage 232 of search engine 130 may store collection 230, search index 210, and collection configuration file 220. Storage 132 may provide access to these files for use by search engine 130 in fulfilling search requests.

Search engine 130 may include search processor 134 to process search requests. Search processor 134 may receive and fulfill translated search requests from mid-tier logic 124.

Search processor 134 may access search index 210 to apply the Boolean logic of a received search. For example, search processor 134 may search across de-normalized indices of multi-valued documents. Search engine 130 may receive search results based on the query.

Search engine 130 may include aggregator 136 to collect search results. As search processor 134 generates results, aggregator 136 may receive and store the generated results. Once the search processing is complete, aggregator 136 may forward the total results to application server 120. For example, aggregator 136 may serve as a local cache of results to provide complete results in a single transmission. Aggregator 136 may apply a format to the documents based on the particular search platform of search engine 130.

The particular functional blocks and arrangement of system 100 may be altered from the depicted configuration based on particular implementation details. In some embodiments, functional blocks may be combined or subdivided based on the available processing resources and hardware. Some functional blocks may be unused or omitted based on the particular application of system 100. For example, based on the given format of the collections that are subject to search, the various functional components described above may be reconfigured to better query the underlying data.

Data Analysis Methods

Figure 3:
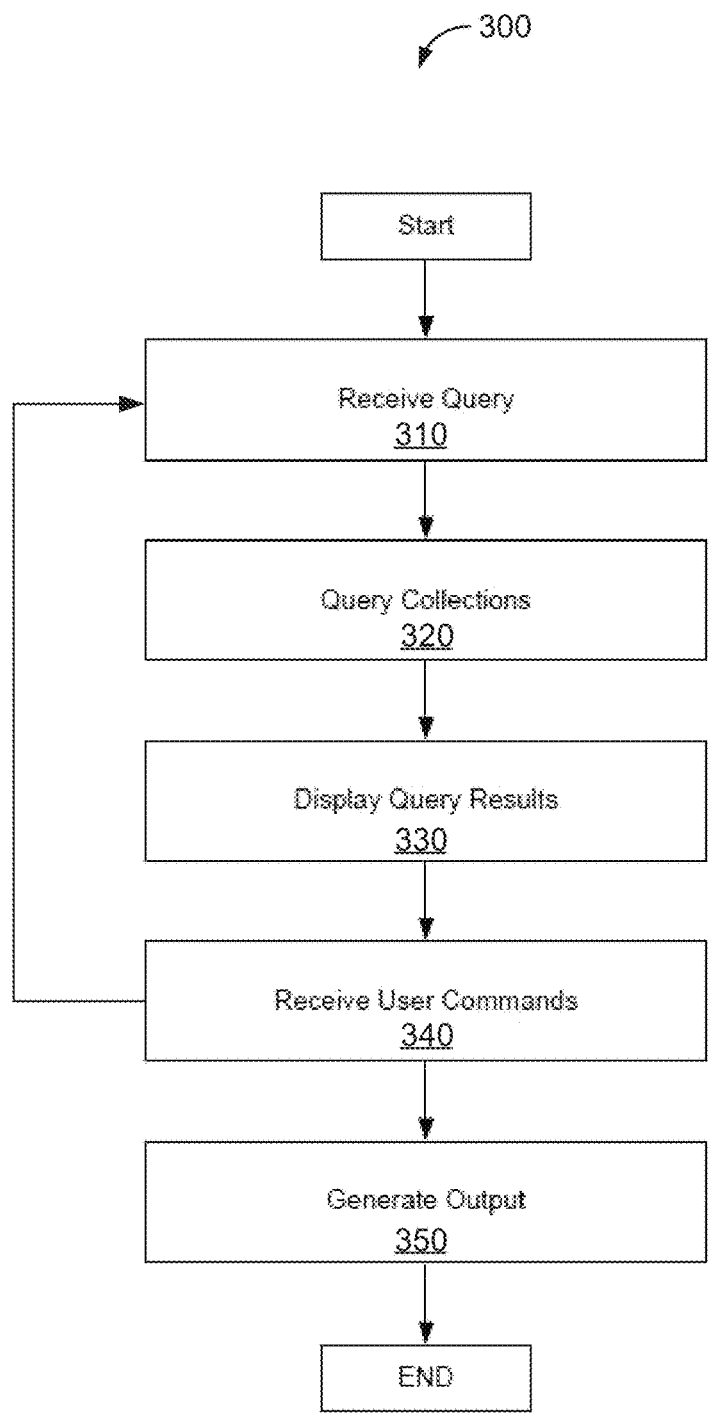
FIG. 3 is a flow chart illustrating example operations performed for analyzing data in accordance with one embodiment of the present disclosure.

FIG. 3 is a flowchart representing an example process 300 performed by an electronic device for manipulating data, consistent with embodiments of the present disclosure. Process 300 is discussed as being performed by system 100. However, other hardware, software, or combinations of the two may be used to perform process 300 consistent with this disclosure.

Process 300 may begin at operation 310, where system 100 receives a query from a user. In one embodiment, user interface 110 may receive user input for a search query. For example, a user may enter a text string, such as a name or phone number of interest to the user. Query builder 114 may initiate a query based on the user text input. For example, query builder 114 may initialize an AbstractQuery object corresponding to the query text.

In one embodiment, query builder 114 may generate a query based on a user selection. A user may select a field of a displayed document or graph. For example, a user may select a bar of a histogram corresponding to the month of March for the year 2013. Query builder 114 may generate a query based on month and year, as well as, the initial query on which the histogram is based. For example, query builder 114 may combine the logic of the sequential selection with the initial query to create a new instance of an AbstractQuery object.

As previously described, various embodiments of the present disclosure contemplate the synchronization of data/query results between multiple visualizations, e.g., different individual visualizations comprising a report. The data/query can involve different forms of or ways of representing the data. When an individual visualization is changed or updated in view of a change/update to another individual visualization, query builder 114 may adapt or generate a new AbstractQuery object based on a first query regarding a first visualization for use with a second visualization.

Process 300 may include operation 320 to query one or more collections. Query builder 114 may transmit a query to search engine 130 via application server 120. In an embodiment, query builder 114 may transmit an instance of an AbstractQuery object to mid-tier logic 124 for reformatting to be compatible with search engine 130. Once search processor 134 receives the translated search, it processes the request with aggregator 136 storing the ongoing results.

In an embodiment, prior to processing the query, search engine 130 may communicate with authenticator 122 to determine whether the current user of the session has sufficient credentials to perform the search on a particular collection. For example, authenticator 122 may provide a security token or cryptographic key indicating that the search may be performed. As alluded to above, authenticator 122 may be invoked to determine what level (if any), a user may have with a particular visualization or report.

In operation 330 of process 300, user interface 110 may display query results. Once search processor 134 completes processing of a particular search, aggregator 136 may provide the search results to mid-tier logic 124, which may translate the search results into a format for user interface 110. User interface 110 may generate a graphical display of the reformatted results. For example, visualizer 116 may generate a grid of results, with fields of resulting documents being arranged in columns.

Process 300 may include operation 340 to receive additional user commands. In an embodiment, user input may result in an additional query. As discussed previously, a user may provide input to further filter results of an initial query. Based on user input, after displaying query results (operation 330), system 100 may generate an additional query, and process 300 may return to operation 310.

In an embodiment, user commands may include commands to generate graphs or reports. A user may indicate that a plot of results over time should be generated. Visualizer 116 may receive user input and reformat results to match user input or predefined formatting criteria.

In operation 350, process 300 may generate output based on search results. In an embodiment, visualizer 116 may render a chart. For example, visualizer 116 may calculate histogram values or pie chart values for a specific field of the search result documents. Visualizer 116 may produce other chart types based on configuration settings, such as user configurable graph settings or third party graph plug-ins.

In an embodiment, operation 350 may include user interface 110 exporting the search results. User interface 110 may generate a file of raw text data or a common spreadsheet file format (e.g., Excel) to allow the user to use the search results data. In some embodiments, user interface 110 may permit the user to share the data to a workgroup within an organization or user social media. Sharing settings may be controlled by authenticator 122 based on user permission of collection configuration file 220. In some embodiments, system 100 may archive frequently used queries. For example, user interface 110 may store popular Abstract-Query instances. System 100 may facilitate or control the sharing of search results using other export and archive mechanisms consistent with this disclosure.

The operations of process 300 are discussed above in a particular order. However, certain operations may be rearranged or omitted. For example, the displaying of query results (operation 330) may not occur until after receiving additional user input (operation 340) indicating results display preferences. Other variations and permutations of process operations may be performed consistent with this disclosure.

Example Data Analysis, Visualization Rendering, and Reporting

Figure 4B:
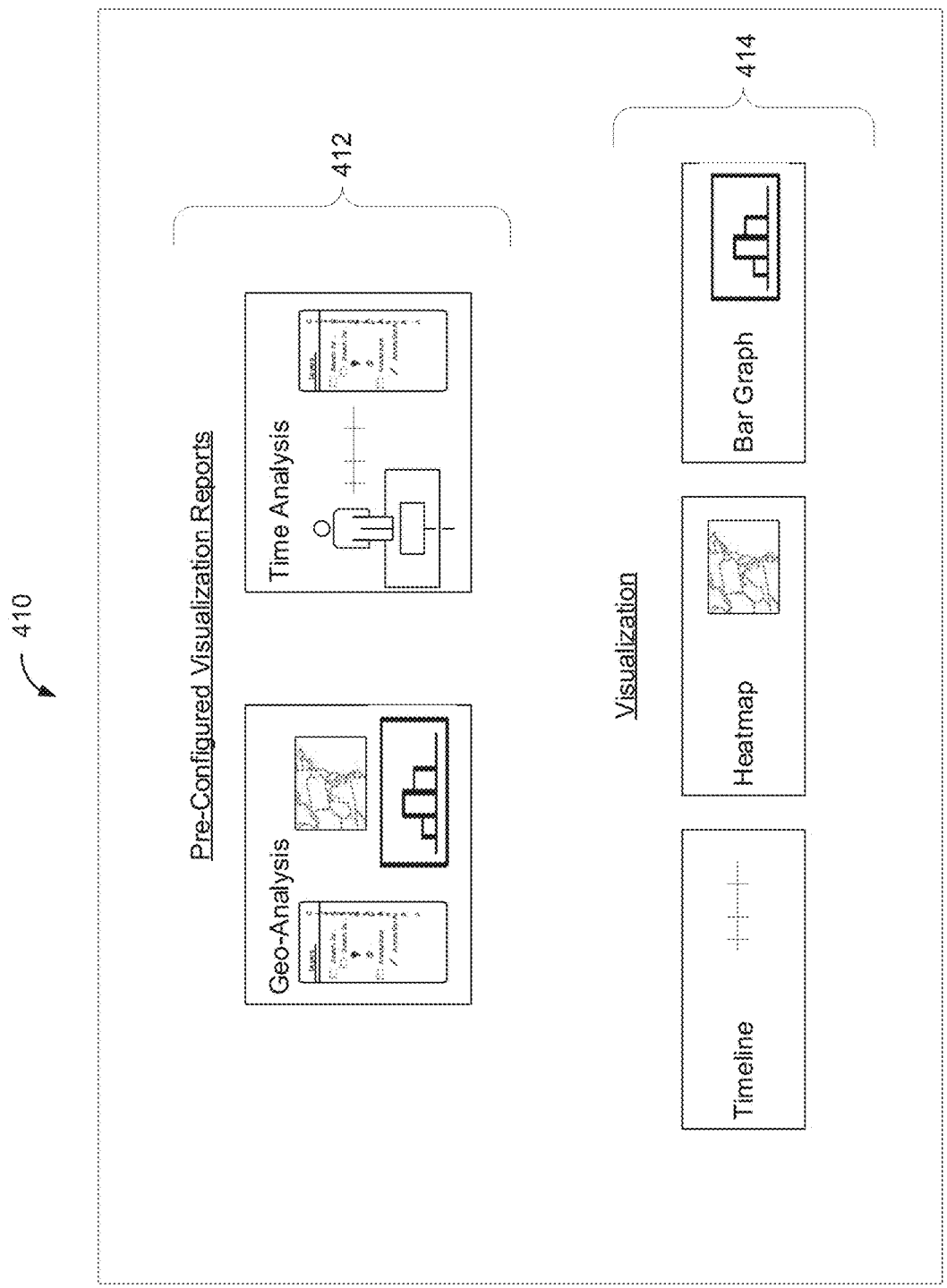
FIG. 4B illustrates an example data analysis interface for selecting a report or individual visualization in accordance with one embodiment of the present disclosure.

FIGS. 4A-4E illustrate example user interfaces for manipulating data, and example visualizations consistent with embodiments of the present disclosure. As illustrated in FIG. 4A, user interface 400 may include various display regions, selection regions, and/or input fields. In some embodiments, user interface 400 can be provided by a web-based application, a standalone application, etc. The application can include or be implemented through a web browser. User interface 400 may be one embodiment of user interface 110 of FIG. 1.

A dataset selection field 402 may be used to input or select a dataset from which data may be analyzed. In some embodiments, the user may specify a dataset, such as in this example, a subpoena-ed set of phone records. The user may specify more than one dataset if desired. Dataset selection field 402, in some embodiments may be a field in which the user can enter a search for relevant datasets that data analysis system 100 may have access to. Dataset selection field 402 may also display the selected dataset for reference by the user.

Query input field 404 of user interface 400 may allow a user to input text, select a subject of interest, etc. in order to facilitate query creation by user interface 110. After a query has been performed, dataset selection field 402 may also present the number of results in the dataset resulting from the query. In the case of multiple datasets being queried, each dataset having data corresponding to or meeting the selected subject of interest, may be displayed along with the number of results in the dataset resulting from the query. In the illustrated example of FIG. 4A, a selected callee phone number "858-555-5555" may be the specified subject of interest, and the relevant dataset may be the aforementioned phone records dataset, which in this example has 228 records related to the specified callee phone number. In some embodiments, a user may select alternative datasets for further analysis, or may select multiple datasets for further analysis (where a combination of query results can be presented at once). A cursor or other mechanism for effectuating user input/selection may be used in accordance with various embodiments, e.g., a peripheral device such as a mouse, a touchscreen, voice, etc.

Data presentation area 406 may be an area in which the results of a query can be displayed. In this example, based on the query regarding callee phone number 858-555-5555, every phone record within the phone record dataset that corresponds to a caller phone number calling the callee phone number is displayed. The amount of information that can be presented may vary and may be specified by the user or can be a function of the data (or metadata) stored in (associated with) the dataset. In this case, the dataset has information regarding the date of each call to the callee phone number, the duration of each call to the callee phone number, the caller phone number that called the callee phone number, and the type of call made to the callee phone number, e.g., wireless or landline.

As shown in FIG. 4A, data presentation area 406 may include a table of cells. Each row may correspond to a specific document, data element(s), etc., resulting from a search query, while the columns may be coordinated to show the fields of the documents (e.g., based on collection configuration file 220). The columns may be sortable based on the data contained in the corresponding cells from high to low, alphabetically, or based on character values, depending upon the format of the data contained in the field. In some embodiments, documents may be flagged, tagged, or otherwise associated with some status of interest. A user may sort the data/records based on, e.g., the total number of flags associated with a data element(s) or based on particular combinations of flags. In some embodiments, data presentation area 406 may allow a user to select a given cell to provide additional data. For example, selection of the cell displaying caller phone number 858-222-2222 may result in additional information being displayed, additional searches being initiated, highlighting of the cell to draw a user's attention, etc.

As noted above, although a tabular format for the presentation of information may, in some instances, be sufficient, presenting visualizations based on the query results will often be easier to understand and/or lead to a deeper understanding/analysis of the subject of interest. Accordingly, various embodiments of the present disclosure allow a user to select an individual visualization or a report comprising multiple visualizations to understand or consume the results of a search query in another manner. In some embodiments, as illustrated in FIG. 4B, a visualization selection screen or page 410 may present an option to select a pre-configured visualization report 412 may be presented to the user. Pre-configured visualization reports may be reports or boards comprising a plurality of visualizations that have been compiled as a default combination of visualizations. The pre-configured visualization reports may be set forth by the application itself, by an administrative user, by the user him/herself through previous interactions with the application, by another, authorized user, etc. Pre-configured visualization reports may be a plurality of visualizations that are related by the type or kind of visualizations present therein. Pre-configured visualization reports may be a plurality of visualizations that according to application developers, other users, etc. are complimentary in terms of analyzing data.

Alternatively, the user may have the option to select individual visualizations 414. Although some types of visualizations are shown and/or discussed herein, such as timelines, heatmaps, bar graphs, etc., it should be understood that any number of visualizations may be presented as options to the user. Individual visualizations may be some form of a combination of visualizations treated as a single visualization.

In still other embodiments, once an individual visualization has been selected by a user, and the data has been rendered according to the visualization, the user may have the option to supplement the visualization with one or more additional visualizations. In this way, the user may, in real-time, create a visualization report.

Figure 4C:
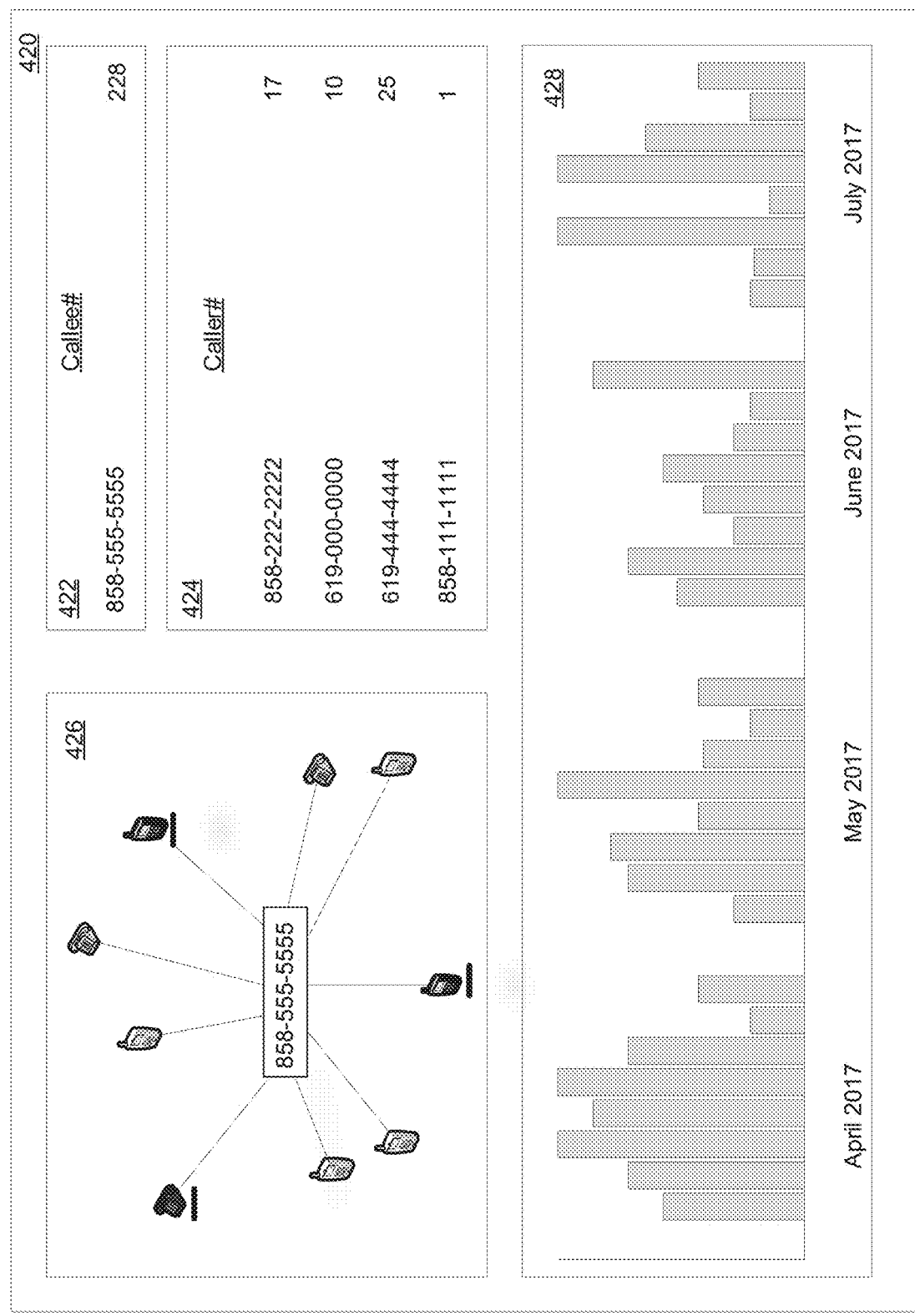
FIG. 4C illustrates an example data analysis report in accordance with one embodiment of the present disclosure.

FIG. 4C is an example report 420 including a plurality of visualizations regarding the subject of interest, which in this example, is the previously mentioned callee phone number 858-555-5555. In some embodiments, the subject of interest and certain related information may be presented in a report (e.g., for reference purposes) or to allow for filters or further queries to be initiated from the report interface. Here, the callee phone number is presented in a subject of interest presentation area 422, along with the number of records corresponding to the callee phone number (previously obtained by the search query). Each corresponding phone record(s) may be presented in a search query results area 424 along with the number of calls associated with each caller phone number. This may be a copy of or derived from the table presented in data presentation area 406 (FIG. 4B). This can provide a non-visual reference of the results as well as provide an interface for the user initiate other actions, e.g., apply filters to further drill down or advance the data analysis. These presentation areas may, in some embodiments be directly copied or derived from the previous table, but in some embodiments, may be the result of a visualization widget.

In FIG. 4B, all the caller phone numbers and related information (date and duration of call) associated with callee phone number 858-555-5555 are presented in a table. However, in FIG. 4C, different visualizations are used to represent that same data or aspects of that data. For example, a link map 426 reveals, in a visual manner, all the calls that were placed to callee phone number 858-555-5555. In this example, the type of call (landline or wireless) is also represented in link map 426. That is, a link map widget of visualizer 116 may generate the link map 426 based on the query results from a search for callee phone number 858-555-5555 in the phone records dataset. In particular, the link map widget may comprise a configuration specification including instructions to parse a record, document, etc. to determine the type of data being visually rendered, the different pieces of data themselves, etc.

It should be noted that visual enhancements or enriching elements can be applied to, e.g., high-scale, low-signal data. Using the link map example of FIG. 4C, the data, e.g., caller phone numbers associated with callee phone number 858-555-5555, may be enhanced, through color, additional graphical/visual elements and/or representations, etc., where the enhancements reflect certain properties associated with the data. For example, one or more of the caller phone numbers can be colored differently, highlighted with some indicator (e.g., underlining), etc. to reflect that these caller phone number are currently being investigated/under review.

Based on this information, the link map widget may generate a visual representation that illustrates links between the results of the search query and the subject of interest. In this example, the subject of interest is the callee phone number, which can be visually presented as a central entity, with links connecting it to the caller phone numbers. Depending on the type of data being analyzed, different visualizations may be used to represent the search results, in this case visual representation of the type of call that was made to the callee phone number. Although the links in link map 426 illustrate "direct" calls to the callee phone number, link map 426 may ascertain or determine that calls were forwarded from other numbers in which case, the links would reflect this data. Again, it should be understood that the particular link map visualization illustrated in FIG. 4C and described herein is merely one example of a link map, and that other versions or visual representations can be used as a link map.

Also illustrated in FIG. 4C is a bar graph visualization 428, which may be generated by a bar graph widget of visualizer 116 (FIG. 1). In this example, the bar graph widget may also parse the query results to determine the relevant data upon which the visualization is to be based. In some embodiments, the visualization may be automatically generated based upon a "generic" widget configuration.

In other embodiments, the bar graph widget may allow for the user to specify certain conditions, parameters, etc. in order to focus the bar graph on that data that is of interest to the user. For example, bar graph visualization 428 represents the number of calls made (by each caller phone number) to the callee phone number per month. In some embodiments, bar graph widget may have a configuration specification that automatically generates a bar graph (based on the logic therein) what it assumes would be desired by the user. In some embodiments, the bar graph widget provides cues to the user to allow the user to specify what information or data is to be represented. For example, in the case of the phone records search results, the user may be given a choice to visualize the duration of each call from a particular caller phone number, or as illustrated, the number of calls made by each caller phone number. As noted above, visualizations can be shared, in which case, the widget may be updated with the preferences of the user and saved for later publication or saved as an artifact (as previously described).

Figure 4D:
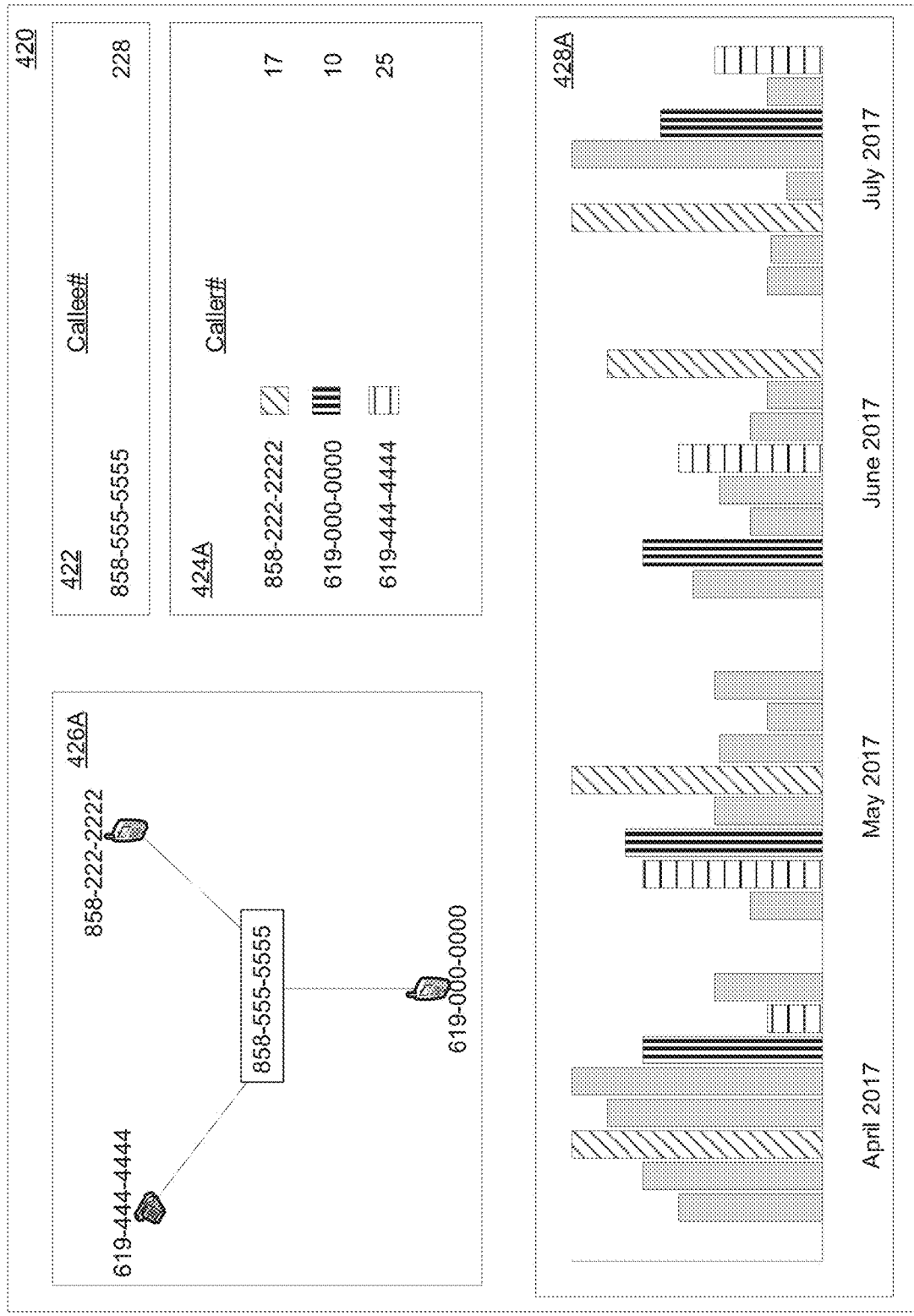
FIG. 4D illustrates an example data analysis report in accordance with one embodiment of the present disclosure.

A user may apply or remove a filter to achieve another level of analysis. For example, applying or removing a filter may allow a user to further drill down a dataset, further explore data associated with a subject of interest, reveal relationships between data associated with the subject of interest without focusing on the subject of interest itself, etc. A filter may be a specification of one or more conditions that identifies data to be focused on. For example a filter may be a particular data element(s), range of data elements, type of data element(s), etc. FIG. 4D illustrates an example of filter application, where the user filters the search query results according to the three caller phone numbers that have made the most calls to the callee phone number. Accordingly, example report 420 may comprise an updated search query results areas 424A, which after application of the filter, only displays the filtered results, in this example, the three caller phone numbers that made the most number of calls to the callee phone number.

As noted above, individual visualizations in a report may update automatically when one of the individual visualizations changes or is updated (in this example, by application of the aforementioned filter). Accordingly, an updated link map 426A presents only the relationship between the callee phone number and the three caller phone numbers. The remaining caller phone numbers previously presented in link map 426 are no longer visible to the user, having been filtered out. Likewise, an updated bar graph visualizations 428A is also presented, where the call volume associated with each of the caller phone numbers having made the most calls to the callee phone number are highlighted. Again, the manner in which individual visualizations may be presented/updated can vary. For example, in some embodiments or depending on the widget/user specifications, updated bar graph visualization 428A may only display the call volume of the three caller phone numbers, rather than highlight their respective call volumes against the call volume of other caller phone numbers (not shown).

Figure 4E:
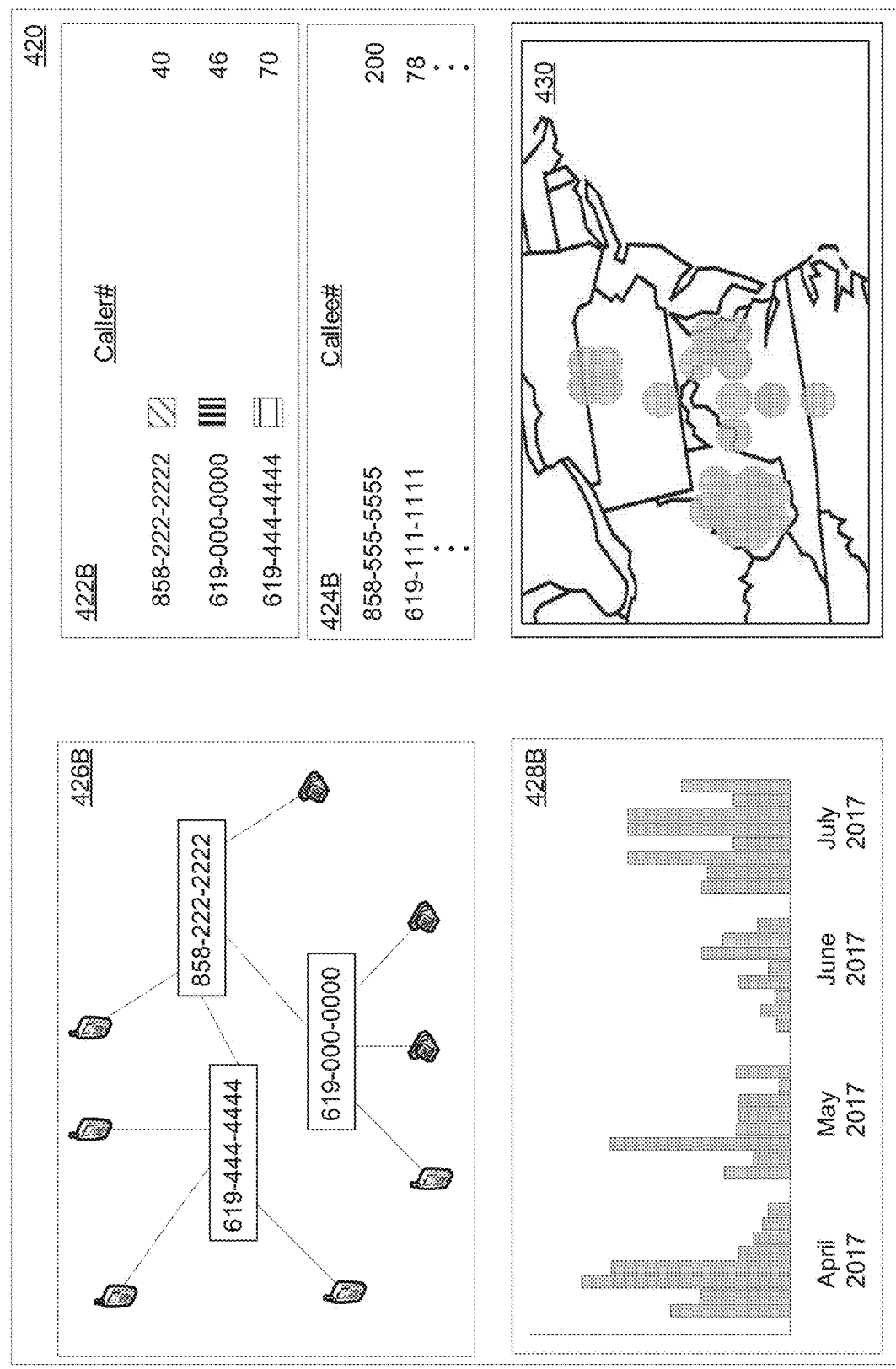
FIG. 4E illustrates an example data analysis report in accordance with one embodiment of the present disclosure.

In some embodiments, a user may wish to remove one or more filters in order to consume the data from a different perspective. For example, FIG. 4E illustrates report 420 updated in accordance with the removal of the callee phone number filter. Accordingly, updated subject of interest area 422B presents the caller phone numbers revealed by the previously applied filter (i.e., caller phone numbers with the most calls to callee phone number 858-555-5555). Updated search query results area 424B presents those phone numbers that the three caller phone numbers of interest have called, i.e., callee phone numbers. Furthermore, an updated link map 426B is rendered and presented in report 420. Updated link map 426B now reveals the links between the three caller phone numbers and the phone numbers each of the three caller phone numbers have called. Likewise, updated bar graph visualization 428B reflects the call volume (calls made) by the three caller phone numbers that are now the subjects of interest. Further still, the user may wish to add another visualization, e.g., a heatmap visualization 430, that illustrates the respective locations of the three caller phone numbers and the locations of the phone numbers they have each called.

The application and/or removal of filters may reveal certain relationships or aspects of a subject of interest or dataset that may not be readily ascertained from a mere tabular listing of search query results. Moreover, the synchronous updating or changing of individual visualizations within a report can also lead to previously unforeseen or not readily apparent relationships or aspects of the subject of interest or dataset. Referring to the above-described examples, it can be appreciated that the original callee phone number may be a phone number known to be used by a particular human subject of interest. The latest phone records may reveal that the human subject of interest has not made any calls from/using the original callee phone number. Thus, attempts to track the location of the human subject of interest may fail as of late. However, using the visualizations described herein as well as the application/removal of filters, a user may discover that although the original callee phone number is no longer associated with any calls, the call activity amongst the three caller phone numbers with the highest call volume relative to the original callee phone number and their associated locations is likely to be the human subject of interest's new phone number.

Figure 5:
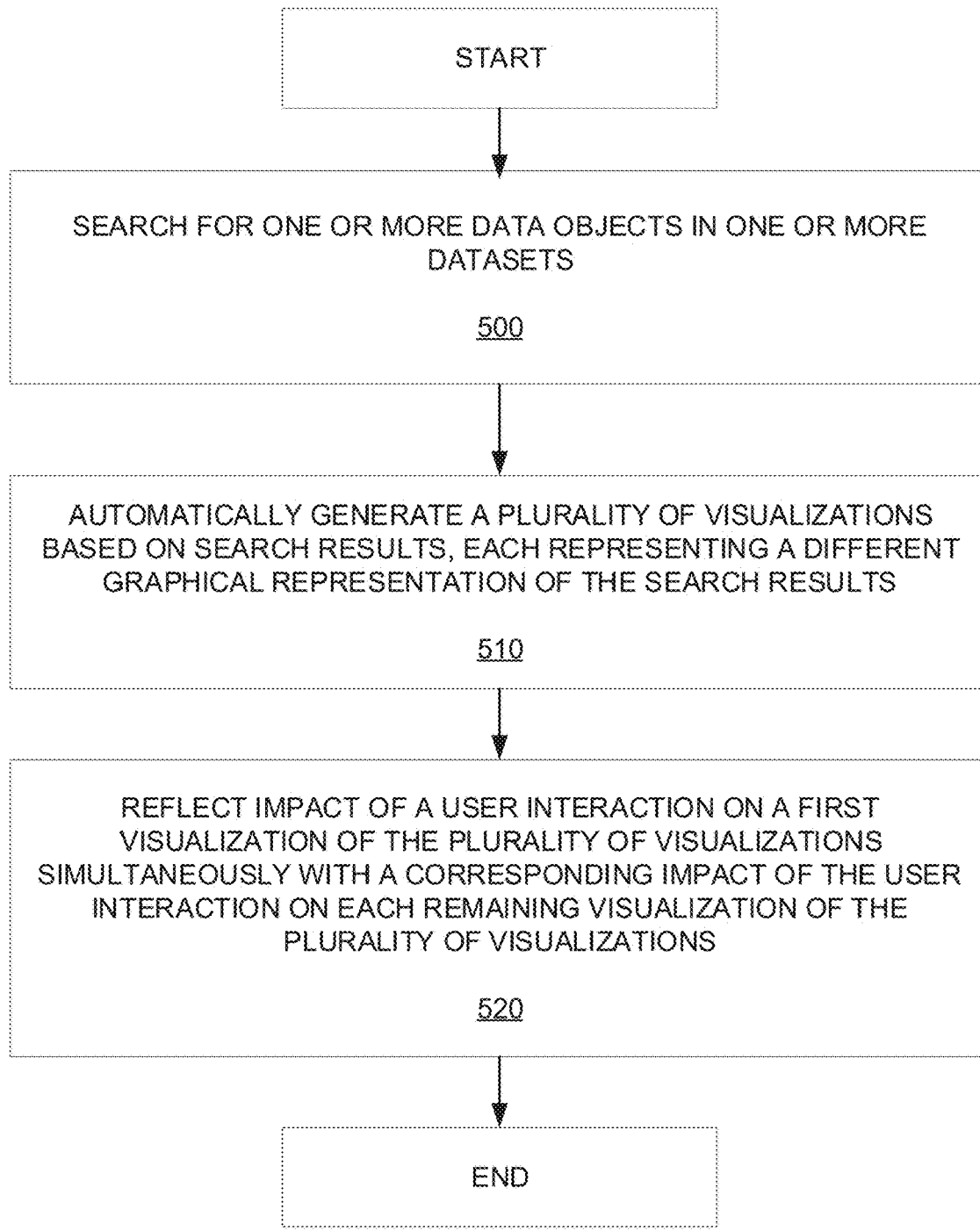
FIG. 5 is a flow chart illustrating example operations that may be performed to simultaneously update a data analysis visualization in accordance with one embodiment of the present disclosure.

FIG. 5 illustrates an example process for generating multiple visualizations for data analysis in accordance with one embodiment of the present disclosure. At operation 500, one or more data objects are searched for in one or more datasets. As previously noted, a user, via user interface 110, may search for a particular subject(s) of interest, i.e., data objects. Accordingly, query builder 114 may generate a query based on the user's textual input, selection, or other indication of the subject(s) of interest to be applied to a particular dataset(s).

At operation 510, a plurality of visualizations based on search results are automatically generated, each visualization representing a different graphical representation of the search results. A default widget defined for each type of visualization may be initiated and used to generate a corresponding visualization, e.g., bar graph, line graph, heatmap, timeline, etc. For example, widgets 116A of visualizer 116 may generate different visualizations based on search results. The one or more queries may be passed from query builder to 114 to application server 120 to search engine 130. After completing the search(es), search engine 130 may return the search results to visualizer 116, where each widget 116A may generate, based on its respective configuration specification, the appropriate visualization.

At operation 520, the impact of a user interaction on a first visualization of the plurality of visualizations is reflected simultaneously with a corresponding impact of the user interaction on each remaining visualization of the plurality of visualizations. For example, a user may apply a filter, e.g., generate another query, to the dataset. Query builder 114 may generate the appropriate query that can be passed to application server 120 and on to search engine 130 to perform the search based on the query. Search engine 130 returns the search result, and visualizer 116/widgets 116A may update the visualizations. In some embodiments, the visualization from which the user applies the filter is updated. Session manager 112, as noted above can monitor the state of the dataset, and notify visualizer 116 that any other operative visualizations should be updated as well. In some embodiments, visualizer 116 notifies to all the operative widgets that updating of their respective visualizations is needed, at which point the operative widgets re-generate or update its corresponding visualization to reflect application of the filter.

Example Computer System

Figure 6:
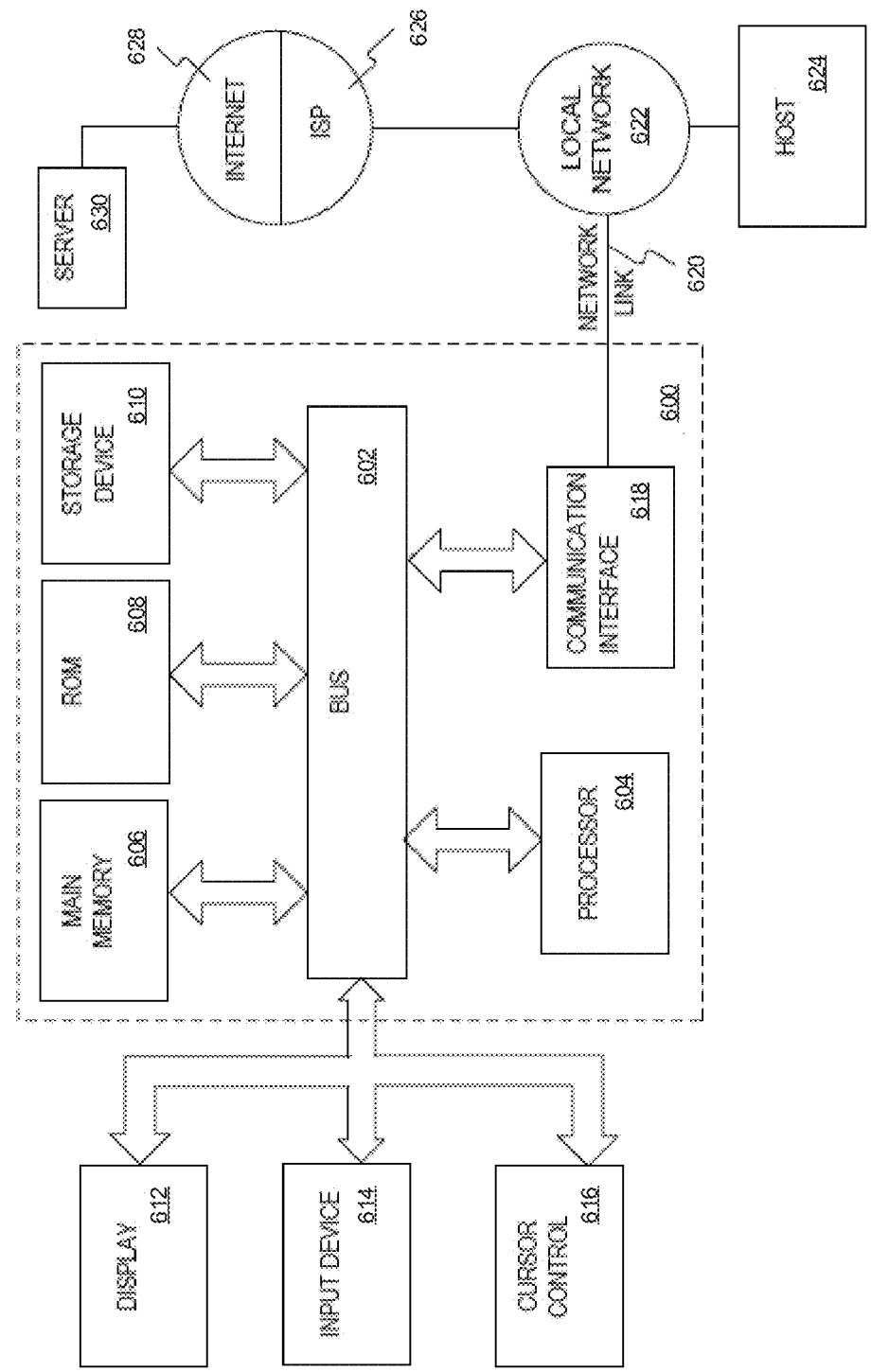
FIG. 6 illustrates a schematic representation of an example computer system in which any of the implementations described herein may be implemented.

FIG. 6 is a block diagram of an exemplary computer system 600 with which embodiments described herein can be implemented, consistent with embodiments of the present disclosure. Computer system 600 includes a bus 602 or other communication mechanism for communicating information, and one or more hardware processors 604 (denoted as processor 604 for purposes of simplicity) coupled with bus 602 for processing information. Hardware processor 604 can be, for example, one or microprocessors.

Computer system 600 also includes a main memory 606, such as a random access memory (RAM) or other dynamic storage device, coupled to bus 602 for storing information and instructions to be executed by processor 604. Main memory 606 also can be used for storing temporary variables or other intermediate information during execution of instructions to be executed by processor 604. Such instructions, after being stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 can be coupled via bus 602 to a display 612, such as a cathode ray tube (CRT), a liquid crystal display (LCD), or a touch screen, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computer system 600 can include a user interface component to implement a graphical user interface (GUI) that can be stored in a mass storage device as executable software codes that are executed by the one or more computing devices. This and other components can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "component," as used herein, refers to logic embodied in hardware or firmware, or to a collection of software instructions, possibly having entry and exit points, written in a programming language, such as, for example, Java, Lua, C or C++. A software component can be compiled and linked into an executable program, installed in a dynamic link library, or written in an interpreted programming language such as, for example, BASIC, Perl, or Python. It will be appreciated that software components can be callable from other components or from themselves, and/or can be invoked in response to detected events or interrupts. Software components configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware components can be comprised of connected logic units, such as gates and flip-flops, and/or can be comprised of programmable units, such as programmable gate arrays or processors. The components or computing device functionality described herein are preferably implemented as software components, but can be represented in hardware or firmware. Generally, the components described herein refer to logical components that can be combined with other components or divided into sub-components despite their physical organization or storage.

Computer system 600 can implement the techniques described herein using customized hard-wired logic, one or more ASICs or FPGAs, firmware and/or program logic which in combination with the computer system causes or programs computer system 600 to be a special-purpose machine. According to some embodiments, the operations, functionalities, and techniques and other features described herein are performed by computer system 600 in response to processor 604 executing one or more sequences of one or more instructions contained in main memory 606. Such instructions can be read into main memory 606 from another storage medium, such as storage device 610. Execution of the sequences of instructions contained in main memory 606 causes processor 604 to perform the process operations described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 610. Volatile media can include dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 602. Transmission media can also take the form of acoustic or light waves, such as those generated during radio-wave and infra-red data communications.

Various forms of media can be involved in carrying one or more sequences of one or more instructions to processor 604 for execution. For example, the instructions can initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 can optionally be stored on storage device 610 either before or after execution by processor 604.

Computer system 600 can also include a communication interface 618 coupled to bus 602. Communication interface 618 can provide a two-way data communication coupling to a network link 620 that can be connected to a local network 622. For example, communication interface 618 can be an integrated services digital network (ISDN) card, cable modem, satellite modem, or a modem to provide a data communication connection to a corresponding type of telephone line. As another example, communication interface 618 can be a local area network (LAN) card to provide a data communication connection to a compatible LAN. Wireless links can also be implemented. In any such implementation, communication interface 618 can send and receive electrical, electromagnetic or optical signals that carry digital data streams representing various types of information.

Network link 620 can typically provide data communication through one or more networks to other data devices. For example, network link 620 can provide a connection through local network 622 to a host computer 624 or to data equipment operated by an Internet Service Provider (ISP) 626. ISP 626 in turn can provide data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, can be example forms of transmission media.

Computer system 600 can send messages and receive data, including program code, through the network(s), network link 620 and communication interface 618. In the Internet example, a server 630 can transmit a requested code for an application program through Internet 628, ISP 626, local network 622 and communication interface 618.

The received code can be executed by processor 604 as it is received, and/or stored in storage device 610, or other non-volatile storage for later execution. In some embodiments, server 630 can provide information for being displayed on a display.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system for presenting visualizations representative of data analysis operations, the system comprising:
   one or more processors and a memory storing instructions that, when executed by the one or more processors, cause the system to:
   receive a search query comprising initialized objects indicating search terms;
   determine whether a search engine is compatible with the initialized objects;
   in response to determining that the search engine is incompatible with the initialized objects, reformat, by middle tier logic, the received search query to create a new search instruction compatible with the search engine;
   perform, by the search engine and according to the compatible search query or the new search instruction, a search for one or more data objects in one or more data sets;
   automatically generate visualizations based on results of the search, each of the visualizations representing a different graphical representation of the results of the search; and
   reflect an impact of a user interaction on a first visualization of the visualizations simultaneously with a corresponding impact of the user interaction on each remaining visualization of the visualizations, the reflecting an impact comprising:
      simultaneously updating the first visualization and the each remaining visualization, based on a new object generated as a result of the user interaction on the first visualization, to apply a selective filter.

2. The system of claim 1, wherein the visualizations comprise any of a histogram, an event line, a line chart, a link map, a heat map, a timeline, a table, and an event block representation; and the instructions, when executed by the one or more processors, further cause the system to perform:
   determining a type of visualization to generate based on a format of one of the data sets, wherein the generated visualizations include the determined type of the visualization.

3. The system of claim 1, wherein the user interaction further comprises one of a filtering operation, a de-filtering operation, a data object selection operation, an aggregation operation of two or more of the data objects, and a sorting operation regarding the one or more data objects.

4. The system of claim 3, wherein each of the plurality of visualizations is generated based upon a JavaScript Object Notation (JSON) configuration, and the instructions further cause the system to:
   share a JSON defining the selective filter and a JSON specification defining views of the visualizations with another user while allowing the another user to view or move the visualizations in a protected mode.

5. The system of claim 4, further comprising instructions that, when executed by the one or more processors, further cause the system to perform at least one of presenting and publishing the JavaScript Object Notation configuration.

6. The system of claim 3, wherein the filtering operation comprises refining the results of the search based upon a subset of the one or more data objects.

7. The system of claim 3, wherein the de-filtering operation comprises refocusing the results of the search on a subset of the one or more data objects.

8. The system of claim 3, wherein the data object selection operation comprises highlighting a subset of the one or more data objects.

9. A method being implemented by a computing system including one or more physical processors and storage media storing machine-readable instructions, the method comprising:
   receiving a search query comprising initialized objects indicating search terms;
   determining whether a search engine is compatible with the initialized objects;
   in response to determining that the search engine is incompatible with the initialized objects, reformat, by middle tier logic, the received search query to create a new search instruction compatible with the search engine;
   performing, by the search engine and according to the compatible search query or the new search instruction, a search for one or more data objects in one or more data sets;
   receiving search results regarding the one or more data objects and generating first and second visualizations of the search results regarding the one or more data objects, the first visualization comprising a graphical representation of the search results from a first perspective, and the second visualization comprising a graphical representation of the search results from a second perspective;
   receiving a selective filtering regarding the first visualization of the search results;
   updating the first visualization based on the selective filtering by adjusting the first perspective; and
   simultaneously updating the second visualization based on the selective filtering by adjusting the second perspective based on a new object generated as a result of the updating of the first visualization.

10. The method of claim 9, wherein the first visualization comprises one of a histogram, an event line, a line chart, a link map, a heat map, a timeline, a table, and an event block representation.

11. The method of claim 10, wherein the second visualization comprises a different one of the histogram, the event line, the line chart, the link map, the heat map, the timeline, the table, and the event block representation.

12. The method of claim 9, wherein the selective filtering comprises a request to refine the search results based upon a subset of the one or more data objects.

13. The method of claim 9, wherein the selective filtering comprises a request to remove a subset of the one or more data objects from the search results and refocus the search results upon a remaining subset of the one or more data objects.

14. The method of claim 9, further comprising representing each of the first and second visualizations as a JavaScript Object Notation (JSON) configuration reflecting characteristics of the search results represented as the first and second visualizations; and sharing a JSON defining the selective filtering and a JSON specification defining views of the visualizations with another user while allowing the another user to view or move the visualizations in a protected mode.

15. A method being implemented by a computing system including one or more physical processors and storage media storing machine-readable instructions, the method comprising:

receiving a search query comprising initialized objects indicating search terms;

determining whether a search engine is compatible with the initialized objects;

in response to determining that the search engine is incompatible with the initialized objects, reformatting, by middle tier logic, the received search query to create a new search instruction compatible with the search engine;

performing, by the search engine and according to the compatible search query or the new search instruction, a search for one or more data objects in one or more data sets;

automatically generating visualizations based on results of the search, each of the visualizations representing a different graphical representation of the results of the search; and reflecting an impact of a user interaction on a first visualization of the visualizations simultaneously with a corresponding impact of the user interaction on each remaining visualization of the visualizations, the reflecting an impact comprising:

simultaneously updating the first visualization and the each remaining visualization, based on a new object generated as a result of the user interaction on the first visualization, to apply a selective filter.

16. The method of claim 15, wherein each of the plurality of visualizations is generated based upon a JavaScript Object Notation (JSON) configuration, and the instructions further cause the system to:

share a JSON defining the selective filter and a JSON specification defining views of the visualizations with another user while allowing the another user to view or move the visualizations in a protected mode.

17. The method of claim 16, further comprising instructions that, when executed by the one or more processors, further cause the system to perform at least one of presenting and publishing the JavaScript Object Notation configuration.

18. The method of claim 15, wherein the user interaction further comprises one of a filtering operation, a de-filtering operation, a data object selection operation, an aggregation operation of two or more of the data objects, and a sorting operation regarding the one or more data objects.

19. The method of claim 15, wherein the selective filter comprises searching for a subset of the one or more data objects within the results of the search and wherein reflecting the impact of the user interaction comprises updating the first visualization to adjust a graphical representation of the results of the search based on results of the search for the subset of the one or more data objects.

20. The method of claim 18, wherein the de-filtering operation comprises removing a subset of the one or more data objects from the results of the search and wherein reflecting the impact of the user interaction further comprises updating the first visualization to adjust a graphical representation of the search results based on removal of the subset of the one or more data objects and maintaining the remaining subset of the one or more data objects.

\* \* \* \* \*